United States Patent [19]
Veazie, III

[11] Patent Number: 5,802,662
[45] Date of Patent: Sep. 8, 1998

[54] VIBRATION FREE NON-SKIP WIPER BLADES

[76] Inventor: Waldemar Veazie, III, 905 SW. Lighthouse Dr., Palm City, Fla. 34990

[21] Appl. No.: 712,258

[22] Filed: Sep. 11, 1996

[51] Int. Cl.⁶ ........................................................ B60S 1/38
[52] U.S. Cl. .................................................... 15/250.48
[58] Field of Search ........................ 15/250.4, 250.48, 15/250.41, 250.361, 250.33, 245

[56] References Cited

U.S. PATENT DOCUMENTS

| | | | |
|---|---|---|---|
| 2,140,453 | 12/1938 | Horton | 15/250.48 |
| 2,179,454 | 11/1939 | Paulus | 15/250.4 |
| 2,733,469 | 2/1956 | Oishei | 15/250.48 |
| 3,040,359 | 6/1962 | Deibel | 15/250.48 |
| 3,121,133 | 2/1964 | Mathues | 15/250.48 |
| 3,238,555 | 3/1966 | Cels | 15/250.4 |
| 3,304,569 | 2/1967 | Christensen | 15/250.04 |
| 3,522,620 | 8/1970 | Nozawa et al. | 15/250.36 |
| 4,019,216 | 4/1977 | Priesemuth | 15/250.03 |
| 4,745,653 | 5/1988 | Bliznak | 15/250.04 |
| 4,754,517 | 7/1988 | Aldous | 15/250.04 |
| 5,048,146 | 9/1991 | Cavenago | 15/250.36 |
| 5,398,371 | 3/1995 | Oyamo | 15/250.41 |

FOREIGN PATENT DOCUMENTS

594842  11/1947  United Kingdom .................. 15/250.4

Primary Examiner—Gary K. Graham
Attorney, Agent, or Firm—Law Offices of Royal W. Craig

[57] ABSTRACT

A windshield wiper blade design incorporating multiple sections, including one section of conventional wiper blade material and a second section of a lower coefficient of friction material. The first section contacts the windshield as the wiper blade is swiped, but as drag causes the blade to deflect (due to low or non-uniform moisture on the windshield), the second section gradually comes into contact with the surface. This lowers the average coefficient of friction of the blade and avoid excessive vibration. A number of embodiments are shown, all of which include a second section of material attached to the first section without creating an additional pivot point (additional to the apex). They alleviate oscillation of the blade as it wipes a windshield, thus eliminating squeaking, squealing, ineffective skipping across the windshield surface, and the resultant increased windshield wiper wear.

16 Claims, 11 Drawing Sheets

VIBRATION FREE NON-SKIP WIPER BLADES

BACKGROUND OF THE INVENTION

1. Field of the Invention

The present invention relates to windshield wiper blades and, more particularly, to an improved blade design that modulates blade friction during operation of the windshield wiper to avoid squeaking and skipping across the windshield.

2. Description of the Background

Conventional vehicles incorporate a front windshield and windshield wiping mechanism that allows the driver of the vehicle to clear moisture and debris while still operating the vehicle. Most windshields are formed in complex curves along all three axes (height, width and depth). Current wiping mechanisms attempt to handle such complexities with a fixed spring-loaded mechanical device that places pressure (e.g., a normal force) on the windshield throughout its cycle of movement. Multiple springs may be used to maintain a reasonably constant normal force across the entire windshield. It has also been found useful to be able to raise or lower the blade velocity depending on the amount of moisture accumulating on the windshield at any given point in time. This control provides the operator with a means to reduce windshield wiper vibration and the resultant squeaking, squealing, or skipping (the latter resulting in incomplete wiping) during periods when moisture accumulation is low. Lowering the wiper blade velocity allows more time for moisture to build up between cycles, with a net effect of reducing the coefficient of friction at the wiper/ windshield interface and the drag acting on the wiper blade. Reducing the drag alleviates undesirable vibration, skipping, and noises and increases the life of the windshield wiper blades. Intermittent wiper systems were developed to automatically modulate the timing of the wipe sequences. These provide control over the time allowed for moisture-build-up, and it becomes possible to control windshield wiper vibration and resultant noise and wear on the wiper blade. Nevertheless, a problem still exists in that the vehicle operator must constantly change windshield wiper settings depending on many circumstances, including rainfall conditions, spray from the highway, and other conditions. Even with constant operator intervention, wiper blades still vibrate unacceptably.

There have been attempts in the past to alleviate the aforementioned vibration problems. For instance U.S. Pat. No. 5,398,371 issued to Oyama seeks to reduce windshield wiper vibration by decreasing the height of the windshield wiper blade and adding a second wiper blade.

U.S. Pat. No. 3,522,620 issued to Nozawa et al. proposes changing the chemical makeup of current windshield wiper blades to incorporate a low coefficient of friction material as well as anti-aging and ozone crack inhibitors.

Figure 1:
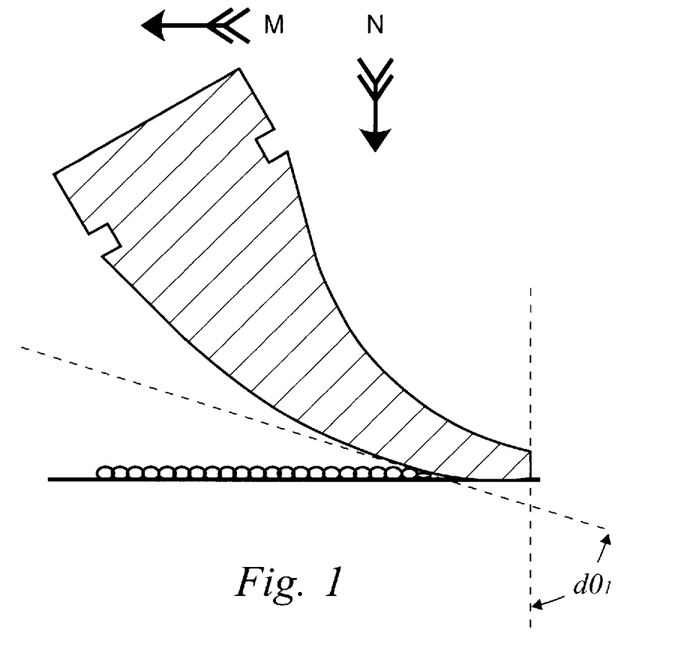
FIG. 1 is a cross-sectional view of a conventional wiper blade operating under applied conditions with a uniform and constant level of moisture on the wind shield.
Figure 2:
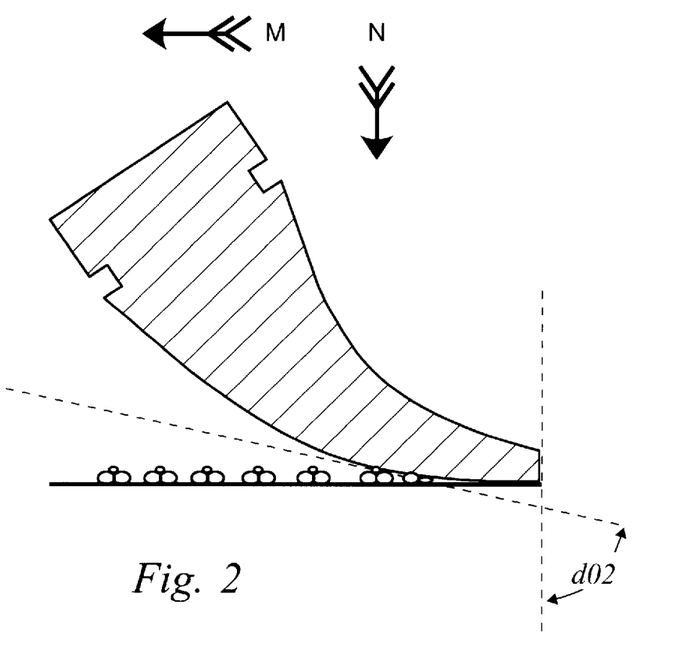
FIG. 2 is a cross-sectional view of a conventional wiper blade as in FIG. 1 operating under applied conditions with a lower level of non-uniform moisture on the wind shield.

Unfortunately, the above described solutions and other known prior art are not capable of adapting to changing conditions or non-uniform distribution of moisture on the windshield. They still result in squeaking, squealing, skipping and chatter all due to excessive windshield wiper assembly vibration. The vibration is initiated and sustained as the blade is wiped across a windshield surface. The problem is further illustrated in FIGS. 1 and 2. FIG. 1 is a cross-sectional view of a conventional wiper blade operating under applied conditions with a and constant level of moisture on the wind shield. FIG. 2 is a cross-sectional view of a conventional wiper blade as in FIG. 1 operating under applied conditions with a lower level of non-uniform moisture on the wind shield.

As seen in FIG. 1 (which reflects perfect conditions), the coefficient of friction of the entire windshield surface is constant and uniform. As a conventional blade is wiped, the blade senses the resultant drag force and deflects rearwardly by the appropriate amount. This in turn curves the blade to achieve the desired squeegee effect, and the blade contacts the windshield at angle $d\theta_1$. The problem arises in less than perfect conditions when the windshield surface coefficient of friction (as determined by the amount of moisture) is too high or not uniform over the entire surface to be wiped. As seen in FIG. 2, the blade senses the drag force and deflects rearwardly. This curves the blade. However, because of the higher coefficient of friction present on the windshield, this curvature of the blade brings more wiper surface into contact with the windshield. The drag on the blade increases, this in turn increases deflection, and the blade contacts the windshield at angle $d\theta_2$. Unacceptable vibration levels occur as the windshield wiper, springs and motor try to overcome the higher drag force.

It would be greatly advantageous to provide a windshield wiper blade that self-adjusts to changing conditions to automatically control the friction interface between the windshield wiper blade and the surface being wiped. This would virtually eliminate the aforementioned vibrations and the consequent squealing, skipping and premature wear. It would also be desirable to provide the above-described windshield wiper blade using current windshield wiper manufacturing processes, thereby keeping costs relatively constant.

SUMMARY OF THE INVENTION

In accordance with the above, it is an object of the present invention to provide a windshield wiper blade design with self adaptive drag to alleviate oscillation of the blade as it wipes a windshield, thus eliminating squeaking, squealing, ineffective skipping across the windshield surface, and the resultant increased windshield wiper wear.

It is another objective to provide a windshield wiper blade construction in which two materials, the second of which has a lower coefficient of friction, are bonded together to form a sturdy and resilient wiper blade.

According to the present invention, the above-described and other objects are accomplished by providing a windshield wiper blade comprising an elongate first section of conventional elastomeric material formed as a squeegee. The first section has a generally triangular cross-section with opposing wiping surfaces converging to an apex (as a conventional wiper blade). In addition, at least one second section of material is attached to the first section, the second section having a lower coefficient of friction than the first section. The second section is attached to one of the wiping surfaces and is spaced apart from the apex. Initially, the first section contacts the windshield as the wiper blade is swiped, but as drag causes the blade to deflect the second section gradually comes into contact with the surface. This lowers the average coefficient of friction of the blade, lowers the drag on the blade, and in turn alleviates undesirable deflection. In summary, deflection control is accomplished in a self-adaptive manner thereby preventing the windshield wiper from vibrating at a level that would engender squeaking, squealing or skipping.

A number of embodiments are shown, all of which include a second section of material attached to the first section without creating an additional pivot point (additional to the apex).

All of the embodiments avoid and alleviate oscillation of the blade as it wipes a windshield, thus eliminating squeaking, squealing, ineffective skipping across the windshield surface, and the resultant increased windshield wiper wear.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENTS

Figure 3:
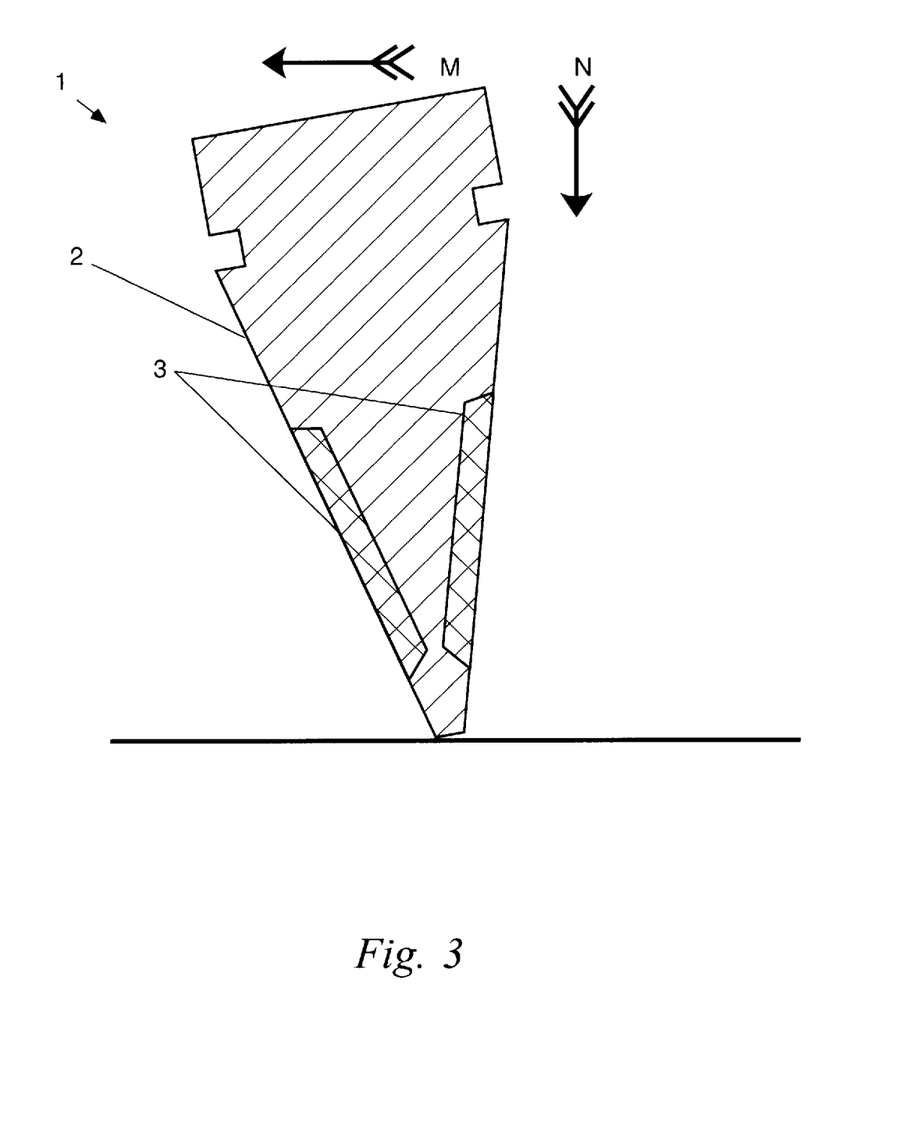
FIG. 3 is a cross-sectional view of one preferred embodiment of a wiper blade 1 in accordance with the present invention under initial conditions with no drag deflection.

FIG. 3 is a cross-sectional view of one preferred embodiment of a wiper blade 1 in accordance with the present invention under initial conditions of no drag deflection. The wiper blade 1 is partially constructed of conventional windshield wiper blade material 2 with lengthwise recesses running the length of the blade. Strips 3 formed of a lower coefficient of friction material are seated in the recesses. In this particular embodiment, the strips 3 have an angular cross-section and the recesses are formed accordingly to fit therein, and this results in a substantially planar wiping surface.

The windshield wiper blade 1 addresses the need to control blade deflection in a self-adaptive manner by controlling the friction interface between the wiper blade and the surface being wiped. The lower coefficient of friction material 3 is attached so as to act as a second rubbing surface which will gradually come into contact with the surface being wiped. This occurs incrementally in an analog fashion as the wiper blade deflects (as a result of drag force). Specifically, as the wiper blade is swiped across the windshield in the direction indicated by arrow M, the lower coefficient of friction material 3, approaches and begins to contact the wiped surface.

Figure 4:
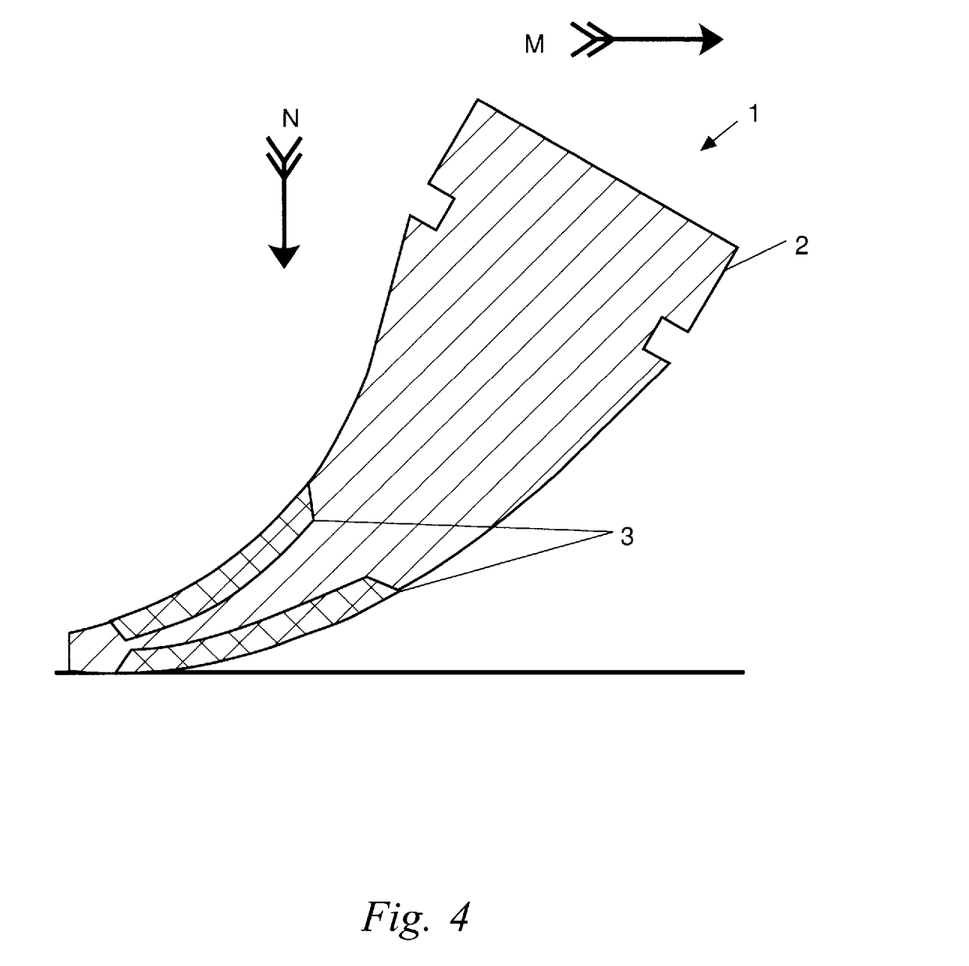
FIG. 4 is a cross-sectional view of the wiper blade 1 of FIG. 3 operating under applied conditions with drag deflection.

FIG. 4 is a cross-sectional view of the wiper blade 1 of FIG. 3 operating under applied conditions with drag deflection. As the deflection increases to the point shown in FIG. 4, more of the lower coefficient of friction material 3 contacts the surface being wiped. The amount of the higher coefficient of friction material 2 that can contact the surface is fixed dimensionally by the distance between the blade edge and the lower edge of the low-coefficient of friction material. Therefore, once an initial deflection threshold is passed, further deflection lowers the average coefficient of friction of the sum of the two materials 2,3 now both in contact with the wiped surface. Drag is proportional to the average coefficient of friction of the wiping materials, the wiped surface, and the average normal force (indicated by the arrow N). Windshield wiper blade deflection is proportional to drag. Consequently, as the average coefficient of friction is reduced, windshield wiper blade deflection is likewise reduced.

Figure 9:
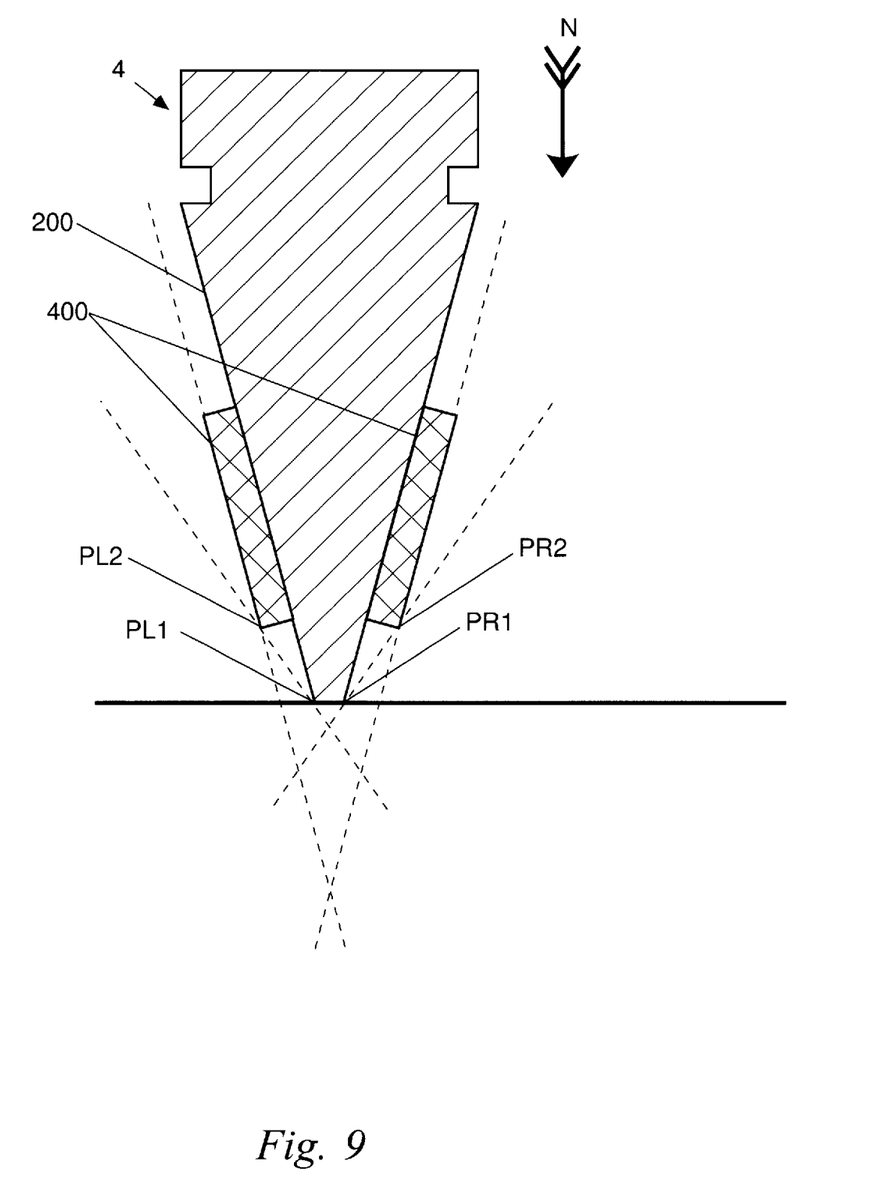
FIG. 9 is a comparative example of an undesirable wiper blade which employs two pivot points P_1 and P_2.

The proposed design positions the lower coefficient of friction material 3 on the higher coefficient material 2 without creating a second fulcrum (or pivot point) that would otherwise alter the normal deflection characteristics of the conventional (higher coefficient of friction) material 2. Additional pivot points cause a rocking horse effect. For comparison, FIG. 9 shows an example of an undesirable wiper blade which employs two pivot points P_1 and P_2. In contrast, the proposed design maintains a single pivot point thereby utilizing the predictable deflection characteristics of the conventional material 2.

Selection of the two wiper blade materials 2,3 should emphasize strength, durability, low wear, flexibility, weather resistance, cost, known form factors, replaceability, low aerodynamic drag, manufacturability, and known friction-induced drag characteristics. The lower coefficient of friction material 3 can be made from any one of numerous readily available, low cost, low friction materials now on the market. Most of these materials are generally classified as organic or inorganic polymers and have commercial names such as Teflon™, Delrin™ and Nylon™. Silicon polymers are also good candidates.

FIG. 4 is a cross-sectional view of the wiper blade 1 of FIG. 3 operating under applied conditions with drag deflection. This is meant to demonstrate the operation of the wiper blade under conditions creating drag deflection. As drag causes the blade 1 to deflect, the second section 3 gradually comes into contact with the surface. This lowers the average coefficient of friction of the blade, lowers the average drag M on the blade, and in turn alleviates undesirable deflection. Deflection control is accomplished in a self-adaptive manner thereby preventing the windshield wiper 1 from vibrating at a level that would engender squeaking, squealing or skipping.

Figure 5:
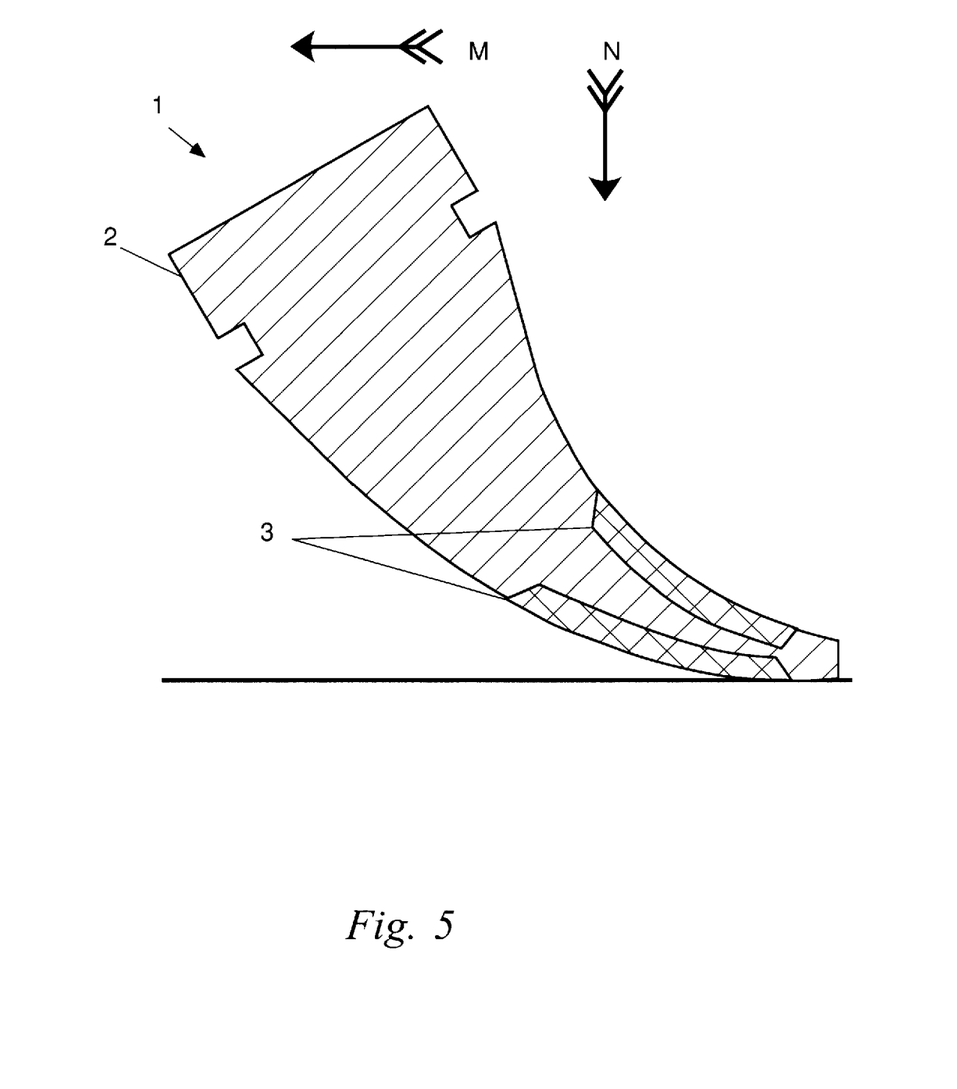
FIG. 5 is a cross-sectional view of the wiper blade 1 of FIG. 3 applied and operating in the opposite direction relative to FIG. 4.

FIG. 5 is a cross-sectional view of the wiper blade 1 of FIG. 3 applied and operating in the opposite direction relative to FIG. 4. Since strips 3 (formed of a lower coefficient of friction material) are seated in both recesses on both sides of the blade, the same above-described principles and operation applies.

Figure 6:
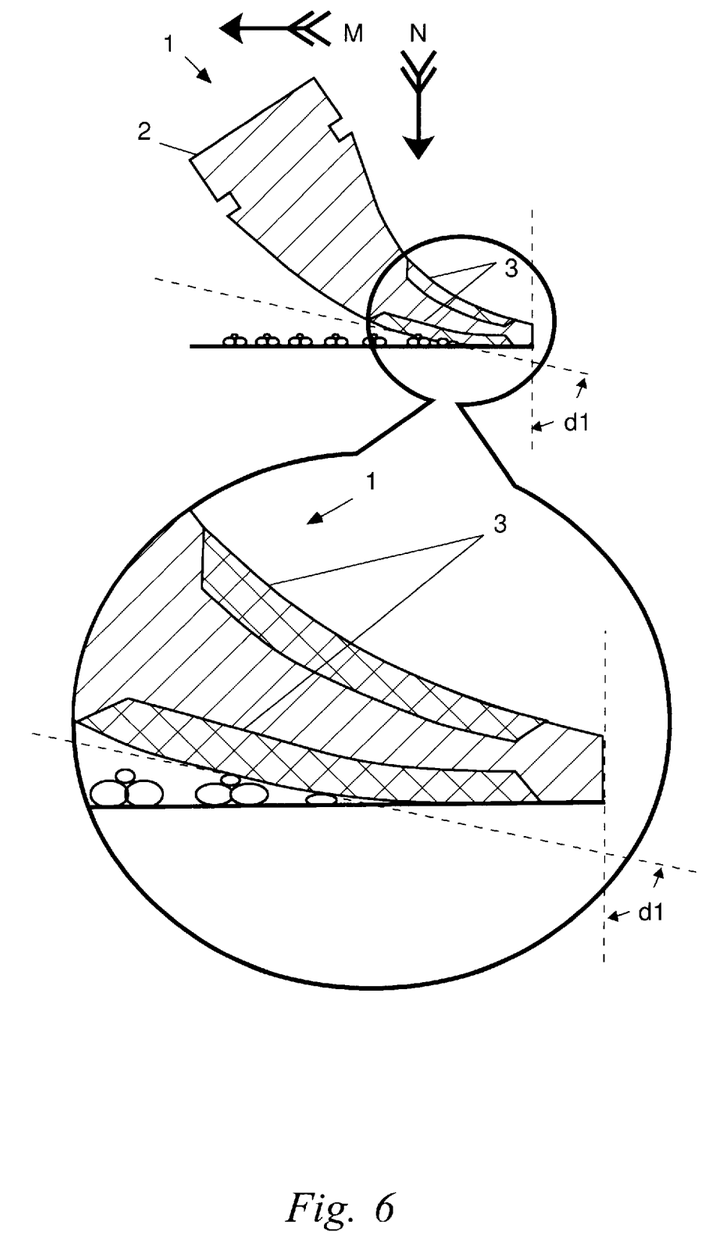
FIG. 6 is a cross-sectional view of the wiper blade 1 of FIG. 3 (with bubble enlargement) operating under applied conditions with a lower level of non-uniform moisture on the wind shield.

FIG. 6 is a cross-sectional view of the wiper blade 1 of FIG. 3 (with bubble enlargement) operating under applied conditions with a lower level of non-uniform moisture on the wind shield. This demonstrate the operation of the wiper blade under less than perfect conditions when the windshield surface coefficient of friction (as determined by the amount of moisture) is too high or not uniform over the entire surface to be wiped. As seen in FIG. 6, the blade senses the drag force and deflects rearwardly. This curves the blade. However, because of the higher coefficient of friction present on the windshield, this curvature of the blade brings more wiper surface into contact with the windshield. With conventional blades, the drag on the blade would increase. However, with the present improved blade 1, the second section 3 gradually comes into contact with the surface. This lowers the average coefficient of friction of the blade, lowers the average drag M on the blade, and in turn alleviates undesirable deflection. The blade 1 contacts the windshield at a lower angle d1. Deflection control is accomplished in a self-adaptive manner thereby preventing the windshield wiper 1 from vibrating at a level that would engender squeaking, squealing or skipping.

Figure 7:
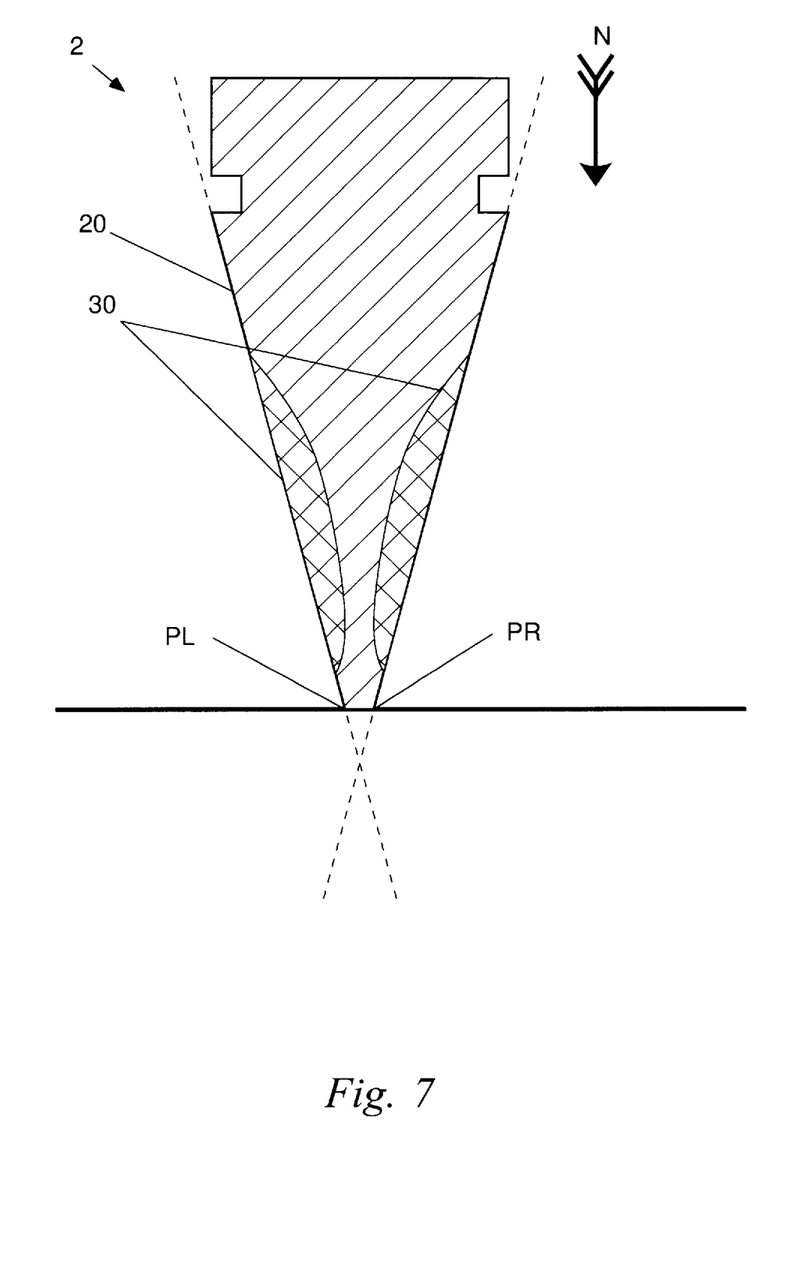
FIG. 7 is a cross-sectional view of a second embodiment of a wiper blade 2 in accordance with the present invention.

FIG. 7 is a cross-sectional view of a second embodiment of a wiper blade 2 in accordance with the present invention. In this embodiment, the strips 30 (which run the length of the blades) have a semi-circular cross-section, the recesses being formed accordingly for a flush fit, and this again results in a substantially planar wiping surface. As before, the windshield wiper blade 2 addresses the need to control blade deflection in a self-adaptive manner by controlling the friction interface between the wiper blade and the surface being wiped. The lower coefficient of friction material 30 acts as a second rubbing surface which gradually comes into contact with the surface being wiped. The lower coefficient of friction material 30 is positioned on the higher coefficient material 20 without creating a second fulcrum (or pivot point) that would otherwise alter the normal deflection characteristics of the conventional (higher coefficient of friction) material 20. Additional pivot points would cause a rocking horse effect as in FIG. 9.

Figure 8:
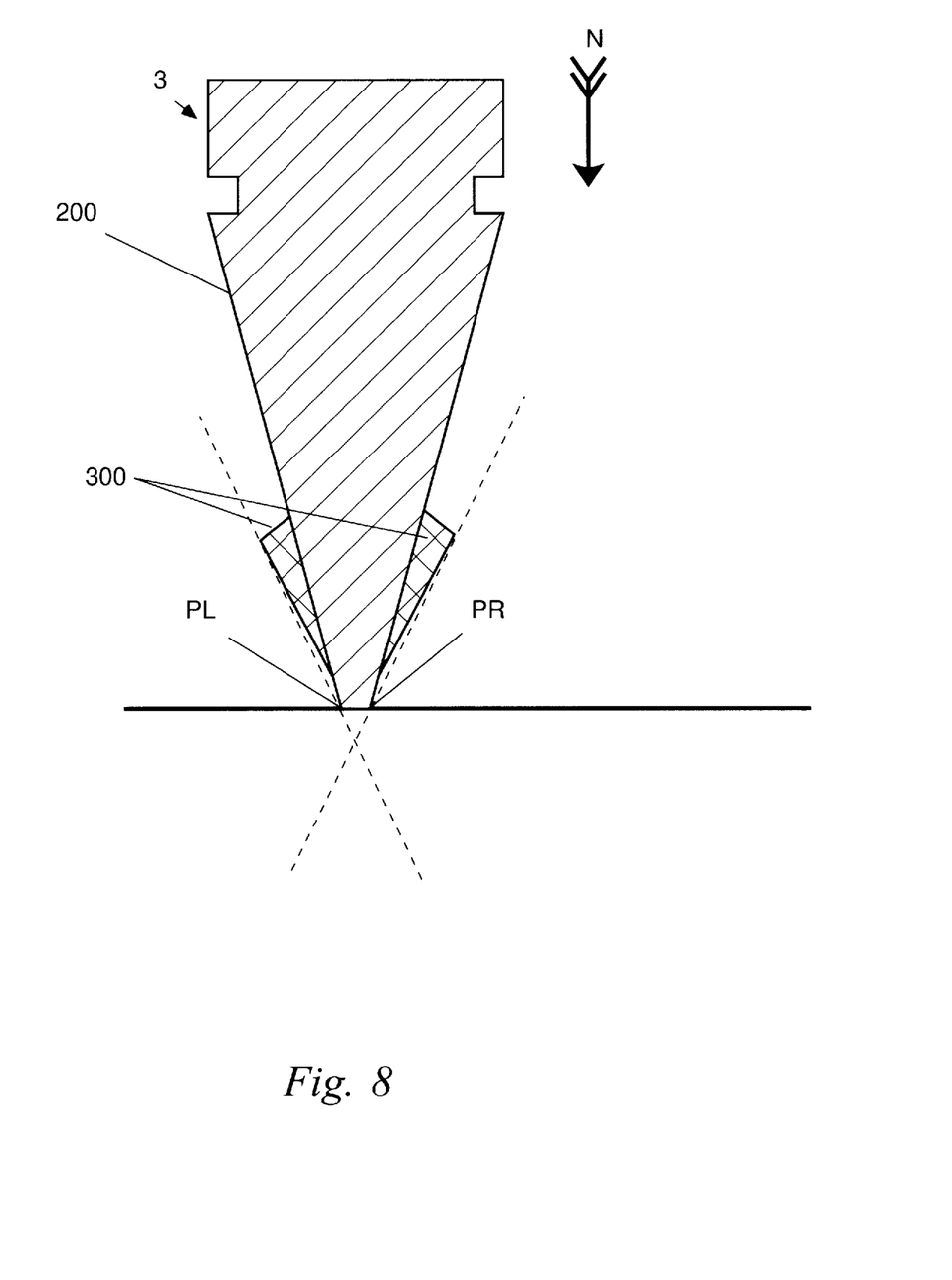
FIG. 8 is a cross-sectional view of a third embodiment of a wiper blade 3 in accordance with the present invention.

FIG. 8 is a cross-sectional view of a third embodiment of a wiper blade 3 in accordance with the present invention. In this embodiment, there are no recesses for strips 30. This allows the use of a commercially available wiper blade 200. Instead, strips 300 having a triangular cross-section are bonded or otherwise adhered to the wiping surfaces of wiper blade 200. Bonding may be accomplished with the use of conventional rubber cement or polysilicon bonding agents. As before, the strips 300 expose a substantially planar wiping surface which is slightly raised from wiper blade 200. However, the wiping surface of strips 300 can be expansive enough to avoid creating a second fulcrum (or pivot point), and as in previous embodiments this avoids the rocking horse effect of FIG. 9.

FIG. 9 is a cross-sectional view illustrating an example of an undesirable wiper blade 4 which employs two pivot points P_1 and P_2. In this case, the protruding edge of the low coefficient of friction material 400 becomes a second fulcrum (or pivot point PL2 and PR2). The second pivot point PL2 and PR2 alters the normal deflection characteristics of the conventional (higher coefficient of friction) material 200. When increased drag force increases blade deflection, the second pivot point PL2 or PR2 makes contact with the wiped surface. Accumulated blade deflection of the of the higher coefficient of friction blade material 200 will be unloaded causing the blade surface area (in contact with the wiped surface) to retract. This retraction lifts the pad 400 edges from the wiped surface. The net result is that the blade 4 winds up oscillating between the two pivot points PL1 and PL2 or PR1 and PR2. This is the undesirable "rocking horse" effect. All embodiments of the presently proposed design maintain a single pivot point thereby utilizing the predictable deflection characteristics of the conventional high-coefficient of friction material.

Figure 10:
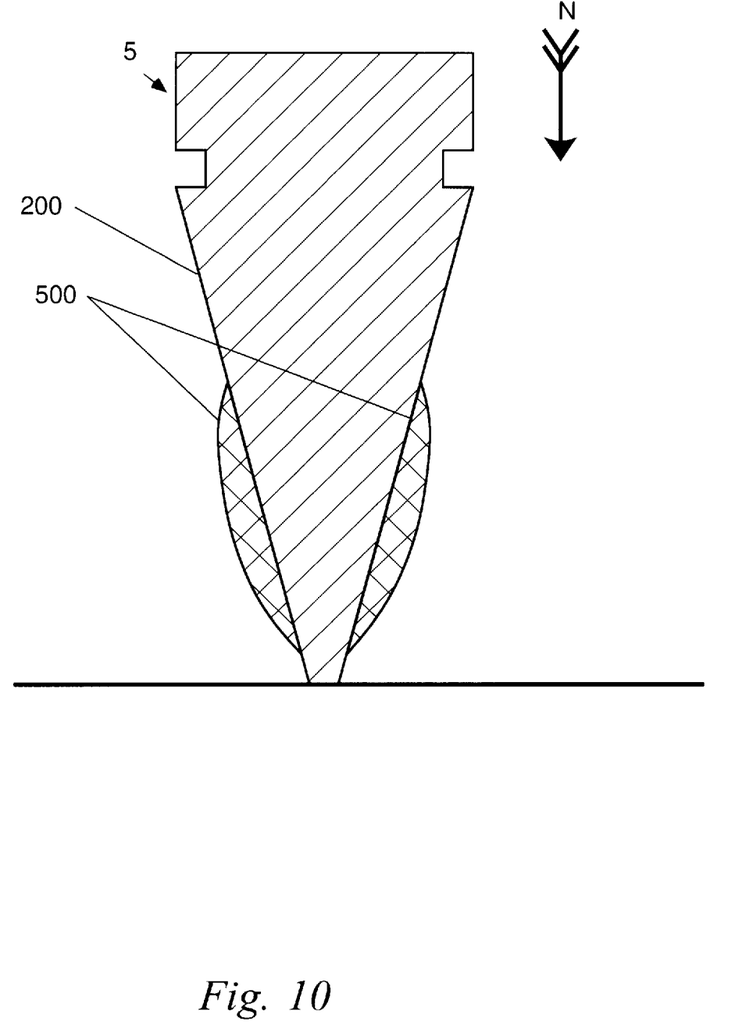
FIG. 10 is a cross-sectional view of a fifth embodiment of a wiper blade 5 in accordance with the present invention which employs bonded strips as a low coefficient of friction material.

FIG. 10 is a cross-sectional view of a fifth embodiment of a wiper blade 5 in accordance with the present invention which again employs bonded strips as a low coefficient of friction material. Here, strips 500 (which run the length of the blades) have a semi-circular cross-section. Bonding may be accomplished with the use of conventional rubber cement or polysilicon bonding agents. The strips 500 expose a semicircular wiping surface which is slightly raised from wiper blade 200. However, the wiping surface of strips 500 are rounded enough to avoid creating a second fulcrum (or pivot point) and, as in previous embodiments, this avoids the rocking horse effect of FIG. 9.

Figure 11:
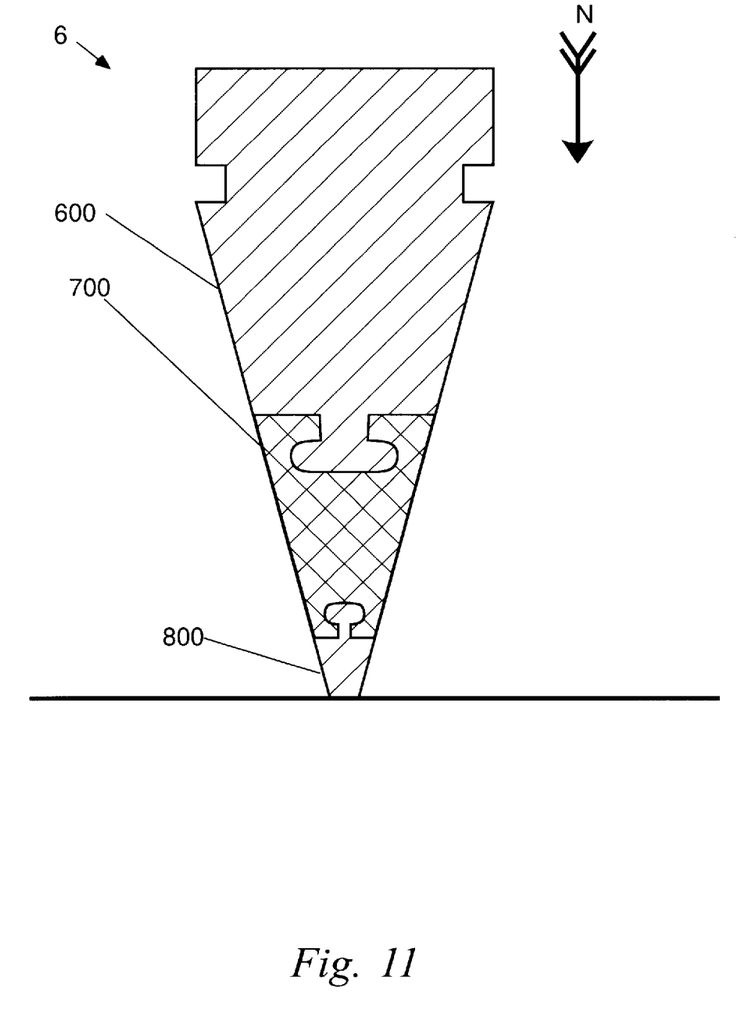
FIG. 11 is a cross-sectional view of a sixth embodiment of a wiper blade 6 in accordance with the present invention which employs a tri-section interlocking structure.

FIG. 11 is a cross-sectional view of a sixth embodiment of a wiper blade 6 in accordance with the present invention which employs a tri-section interlocking structure. In this embodiment, a first section of conventional windshield wiper blade material 600 includes an interlocking rib protruding from the downward surface. The rib fits into a corresponding channel formed on the upper surface of a mating lower coefficient of friction second section 700. A like channel is formed on the lower surface of the second section 700, and this grips and secures a third section 800 formed of conventional windshield wiper blade material and having an upwardly protruding rib. As before, the lower coefficient of friction mid-section 700 acts as a second rubbing surface which gradually comes into contact with the surface being wiped. This is done without creating a second fulcrum (or pivot point) that would otherwise alter the normal deflection characteristics of the conventional (higher coefficient of friction) sections 600 and 800. The rocking horse effect is avoided.

Figure 12:
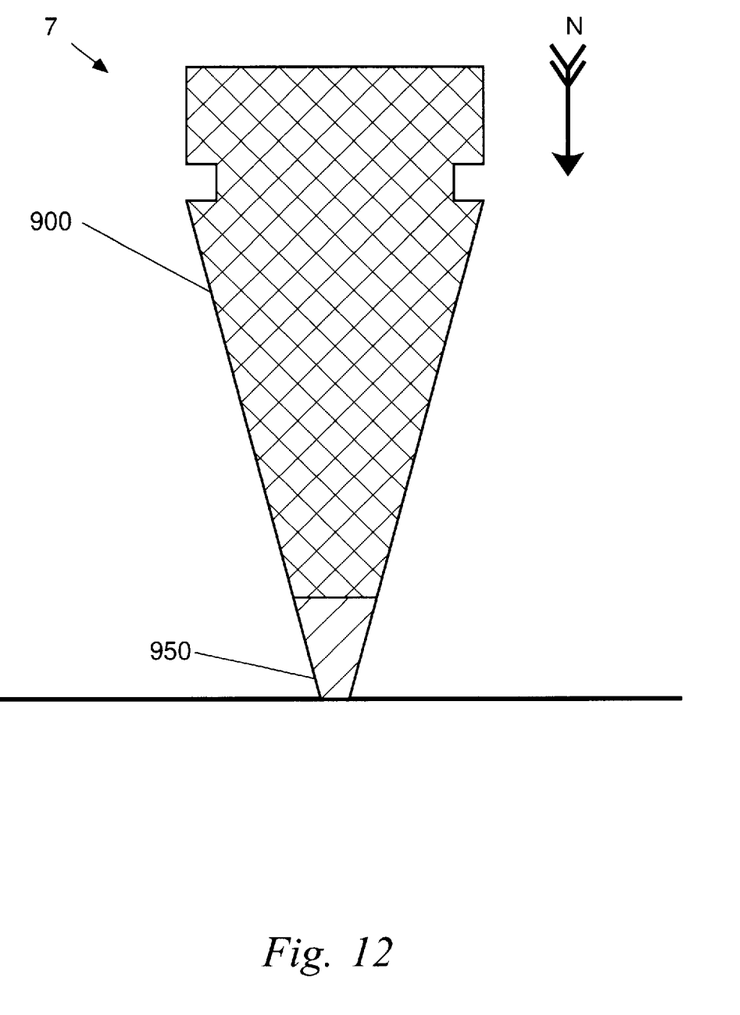
FIG. 12 is a cross-sectional view of a seventh embodiment of a wiper blade 7 in accordance with the present invention which employs a dual-section bonded structure.

FIG. 12 is a cross-sectional view of a seventh embodiment of a wiper blade 7 in accordance with the present invention which employs a dual-section bonded structure. In this embodiment, a first section of conventional windshield wiper blade material 950 is bonded or adhered to a lower coefficient of friction section 900. Bonding may be accomplished with the use of conventional rubber cement or polysilicon bonding agents. The same results and advantages are achieved.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. In a windshield wiper assembly including a windshield wiper blade for wiping a windshield surface during a wiping operation, said blade comprising an elongated body of conventional elastomeric material of a first coefficient of friction formed as a squeegee with opposing first and second wiping surfaces converging to an apex, and at least one strip of material of a second, lower coefficient of friction than said first coefficient, said strip having a substantially smooth, continuous third wiping surface, said lower coefficient of friction strip being attached to said body adjacent said first wiping surface and spaced from said apex in order to gradually come into contact with the windshield surface being wiped upon deflection of said body in said wiping operation;

whereby increasing deflection of said wiper blade during said operation gradually increases contact of the first surface of the body up to a full contact area thereof and thereafter increases contact only of the third wiping surface of the lower coefficient of friction strip to thereby lower the average coefficient of the blade and avoid undesirable vibration.

2. In a windshield wiper assembly according to claim 1, wherein said lower coefficient of friction strip of material is attached to said body without creating a pivot point additional to said apex.

3. In a windshield wiper assembly according to claim 2, wherein said lower coefficient of friction strip of material is formed as an elongate strip adapted to fit within a corresponding channel formed in the body.

4. In a windshield wiper assembly according to claim 3, wherein said lower coefficient of friction strip of material is formed as an elongate strip having a substantially rectilinear cross-section.

5. In a windshield wiper assembly according to claim 3, wherein said lower coefficient of friction strip of material is formed as elongate strip having a substantially semi-circular cross-section.

6. In a windshield wiper assembly according to claim 2, wherein said lower coefficient of friction strip of material is formed as an elongate strip bonded exteriorly to the body.

7. In a windshield wiper assembly according to claim 6, wherein said lower coefficient of friction strip of material is formed as an elongate strip having a substantially triangular cross-section.

8. In a windshield wiper assembly according to claim 6, wherein said lower coefficient of friction strip of material is formed as an elongate strip having a substantially semi-circular cross-section.

9. In a windshield wiper assembly including a windshield wiper blade for wiping a windshield surface during a wiping operation, said blade comprising an elongated body of conventional elastomeric material of a first coefficient of friction formed as a squeegee with opposing first and second wiping surfaces converging to a tip, and opposing strips of material of a second, lower coefficient of friction than said first coefficient, said strips having substantially smooth, continuous third wiping surfaces, said lower coefficient of friction strips being attached to said body adjacent said first and second wiping surfaces respectively and spaced from said tip to allow a limited first area of contact between said windshield surface and one of said first and second wiping surfaces and progressing as a function of increasing blade deflection to include a second area of contact between an adjacent strip of lower coefficient of friction material and said surface being wiped;

whereby increasing drag and deflection of said wiper blade during said operation gradually increases contact of the first area to the limit of said one of said first and second wiping surfaces and thereafter increases contact only of the third wiping surface of an adjacent strip to thereby lower the average coefficient of friction of the blade.

10. In a windshield wiper assembly according to claim 9, wherein said strips are attached to said body without creating pivot points additional to said tip.

11. In a windshield wiper assembly according to claim 10, wherein said strips are adapted to fit within corresponding channels formed in the opposing wiping surfaces of said body.

12. In a windshield wiper assembly according to claim 11, wherein said strips have a substantially rectilinear cross-section.

13. In a windshield wiper assembly according to claim 11, wherein said strips have a substantially semi-circular cross-section.

14. In a windshield wiper assembly according to claim 10, wherein said strips are bonded exteriorly to the opposing wiping surfaces of said body.

15. In a windshield wiper assembly according to claim 14, wherein said strips have a substantially triangular cross-section.

16. In a windshield wiper assembly according to claim 14, wherein said strips have a substantially semi-circular cross-section.

* * * * *